July 25, 1950  R. SAULNIER  2,516,346
AIRCRAFT CONTROLLING SYSTEM FOR
FLAPS AND LANDING GEAR
Filed June 29, 1946  4 Sheets-Sheet 4

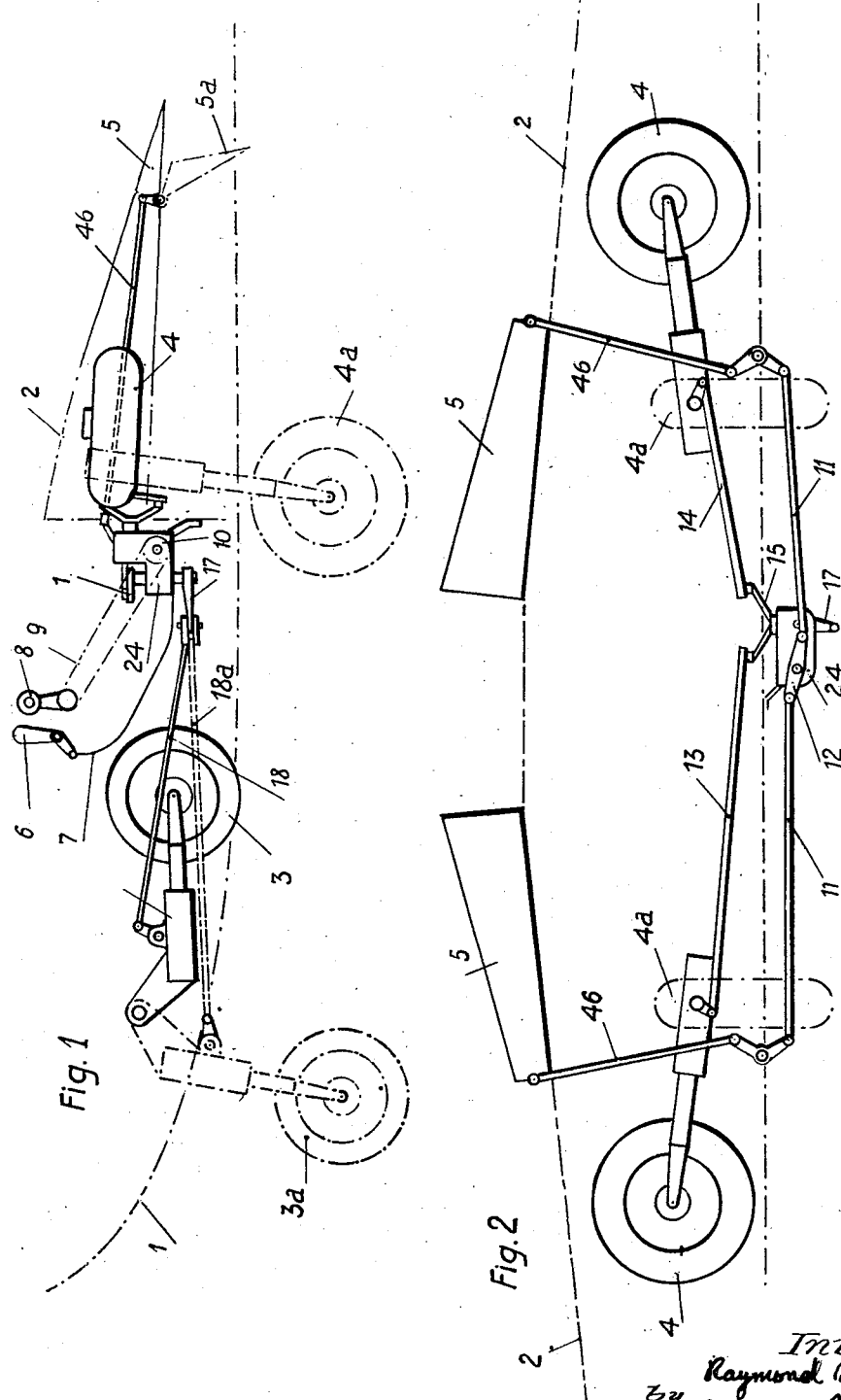

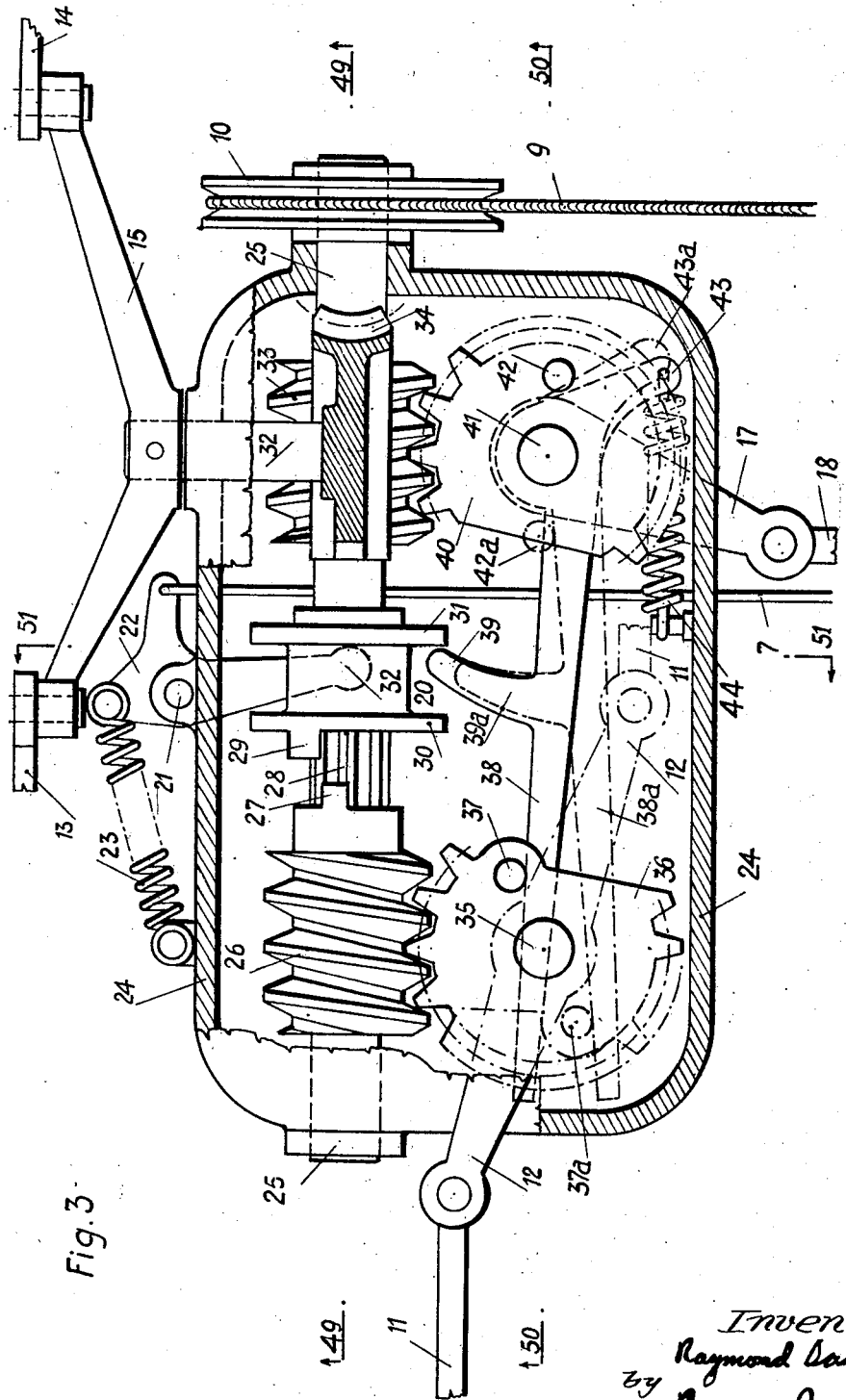

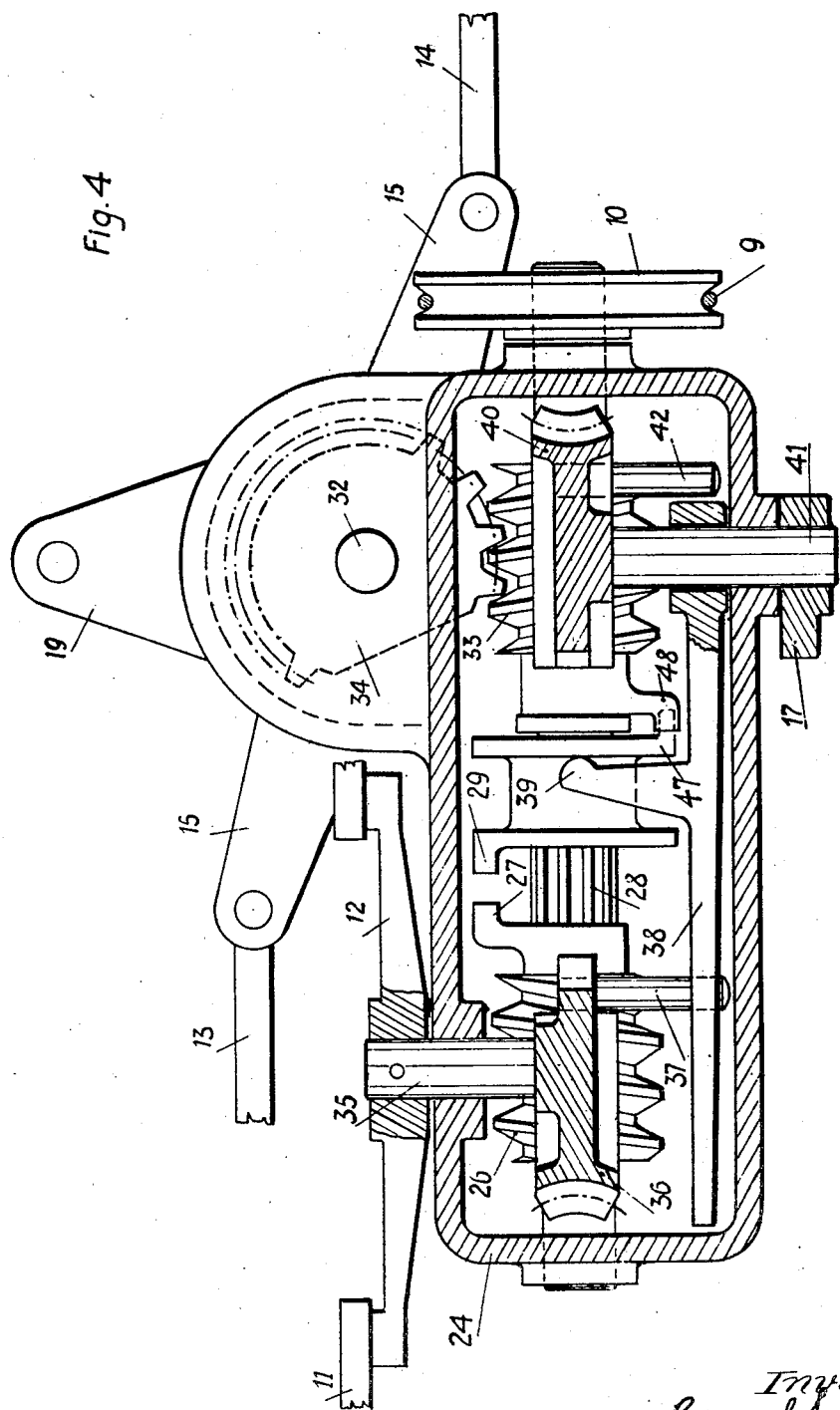

Inventor:
Raymond Saulnier
by Brown & Oeward
Attorneys

Patented July 25, 1950

2,516,346

UNITED STATES PATENT OFFICE 2,516,346

AIRCRAFT CONTROLLING SYSTEM FOR FLAPS AND LANDING GEAR

Raymond Saulnier, Paris, France

Application June 29, 1946, Serial No. 680,400
In France March 7, 1946

3 Claims. (Cl. 244—102)

It is common knowledge at the present time that aircraft equipment includes retractable landing gear as well as moving parts of the wings such as high-lift flaps planned to change the aerodynamic properties of the aircraft, and especially of the wing sections for modifying the drag or lift of the complete structure.

Just at the time of landing, the pilot must control on the one hand the pivoted wing sections, hereinafter called flaps and, on the other hand, the landing gear.

The present invention aims at grouping together the control means for the flaps and the landing gear into one single device with small overall dimensions, that may be operated by the same control member.

Moreover, as the pilot is obliged to control his flaps since it is this control that decides the slowing-down of the aircraft, but forgets sometimes to drop his landing gear, provision has been made, in accordance with a preferred form of execution of the invention to arrange the dual-control device in such a way that the flaps can be controlled only if the landing gear control has operated previously.

The chief member of the device in accordance with the invention is a shaft located in a closed casing and on which are set loose two worms, while a sleeve is slidingly carried on this shaft between the two worms so that it can change its position along the shaft without being capable of revolving with reference thereto; this sleeve can engage with either one or the other of the two worm-gears mentioned above. Each of the two worm-gears is besides in gear with at least one worm wheel that controls, on the one hand, the flaps, and, on the other hand, the landing gear.

In accordance with a preferred form of execution, the movable sleeve can only be engaged with the worm that controls the flaps, once the landing gear is dropped, and this forces the pilot to let down his landing gear before acting on the flaps.

The invention will be understood better with the help of the attached drawings on which a form of execution of the invention has been illustrated by way of example. In said drawings:

Fig. 1 is a diagrammatic front view of the control system.

Fig. 2 is a corresponding plan view.

Fig. 3 is a section of the dual-control device.

Fig. 4 is a section through line 50—50 of Fig. 3.

Figure 5:
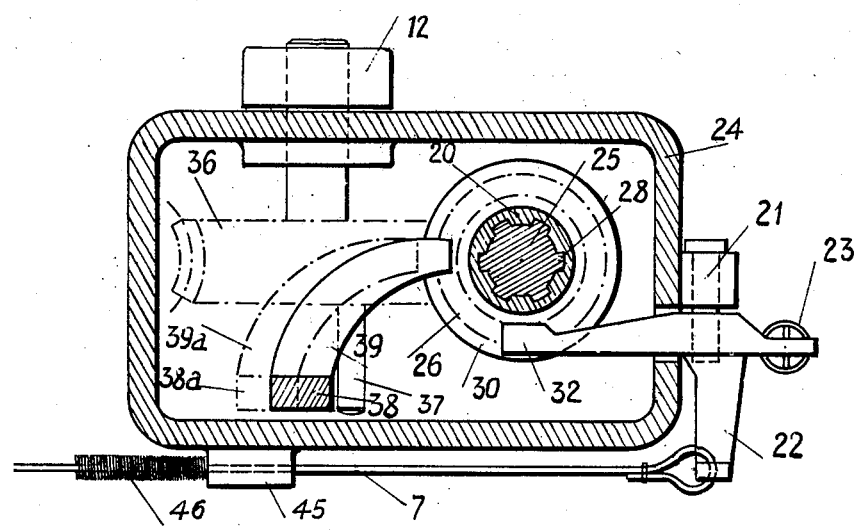
Fig. 5 is a section through line 51—51 of Fig. 3.

Referring to Figs. 1 and 2, the fuselage is shown at 1 and a portion of a wing at 2. In the example illustrated the aircraft carries an undercarriage of the tricycle type showing the front wheel at 3 and the rear wheels at 4.

Obviously the invention is in no way tied to aircraft carrying undercarriages of tricycle type and it may be employed just as well with aircraft carrying undercarriages of the usual type.

In Figs. 1 and 2 the wheels are shown in full lines, at 3 and 4 in their retractile position and at 3a and 4a in dot and dash lines, in their landing position. The flaps are shown in 5 in the flight position and at 5a in landing position. The control means for the wheels are shown at 13 and 14 for the back wheels 4 and at 18 for the front wheel 3, while the flap controls are shown at 11 and 46. The retraction of the wheels is operated by means of a crank 6, that controls through a wire cord 7 the sliding sleeve 30 arranged between the two worms 26 and 33 (see Fig. 3), and the worm 26 acts on the control of the flaps as described later through the rods 11 and 46. The control of the landing gear is carried out by means of a crank 8 acting through a chain 9 on sprocket-wheel 10 keyed to the shaft 25, while the worm 33 acts through a worm-wheel 34 on the shaft 32 that carries two arms 15 linked to the ends of the rods 14 and 13, while the wheel 3 is retracted by means of a second worm-wheel 40 meshing also with the worm 33, which wheel 40 carries an arm 17 acting on the rod 18. In Figs. 1 and 2 the assembly of the dual-control device is shown diagrammatically at 24.

Figure 6:
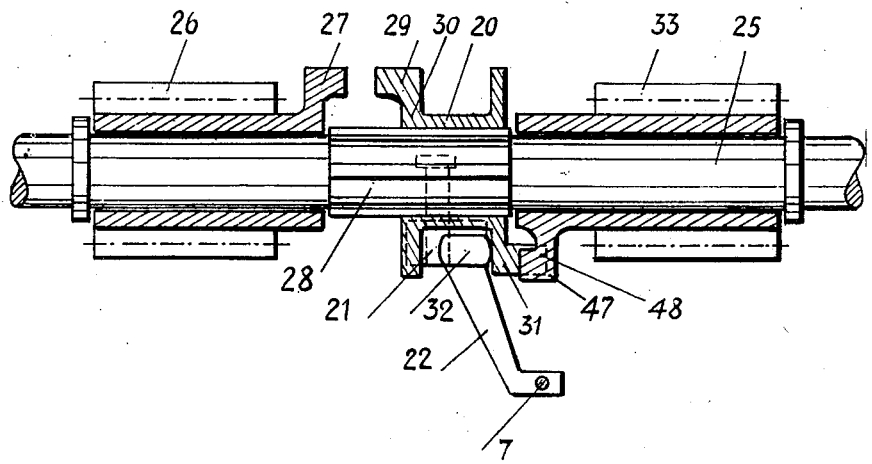
Fig. 6 is a sectional view on line 49—49 of Fig. 3 showing the detail of the engagement of the sliding sleeve with the worms.

Referring more particularly to Figs. 2 to 6, the casing for housing the control device is shown again at 24, the shaft that can be given a turning motion through the crank 8, the chain 9 and the sprocket-wheel 10, the two worms rotatably mounted on the shaft 25 at 26 and 33 and at 30, the sleeve that can slide along the shaft 25 but is prevented from turning in relation to the shaft by the splines 28. The wire cable 7 acts on a lever 22 urged moreover by a spring 23 towards the position shown in Fig. 3. When pulling on the cable 7 by means of the crank 6, there is produced resulting turning action of the lever 22 around the axis 21, and its arm 32 urges the sleeve 30 from the right towards the left. However, this movement is prevented by the arm 39 of a lever 38, as long as this arm remains in the position illustrated in Fig. 3. This lever 38 is hinged on a shaft 41 which carries besides the worm-wheel 40. This wheel is furnished with a dog 42. Moreover, the worm-wheel 36 meshing with the worm 38 is drawn towards the position of Fig. 3 by a spring 44 acting on the end 43 of the lever. A second worm-wheel 34 set on the shaft 32 that controls the two rods 13 and 14 acting on the wheels 4, meshes also with the worm 33 while the worm-wheel 36, rigidly with the shaft 35 that controls through the two arms 12 the rods 11 acting on the flaps, meshes as stated with the worm gear 26. Finally, the arm 17 controlling the rod 18 that ensures the operation of the wheel 3 is rigid with the worm-wheel 40.

The working of the device is easy to understand.

In the position shown in Fig. 3, the flaps take up the position shown in full lines in Fig. 1 and the wheels 3 and 4 likewise the positions shown in full lines in Figs. 1 and 2. If the pilot wished to lower the flaps 5, by pulling on the handle 6, he could not do so owing to the fact that the sliding sleeve 30 could not engage the worm 26 that executes this operation by acting on the worm-wheel 36 rigid with the shaft 35. The pilot is thus aware that he is forced to first act on the dropping of the landing gear. To this end, he begins by turning the crank 8 and thus causes the shaft 25 to turn, by means of the chain 9 and the sprocket wheel 10. As in this position the sleeve 30 is engaged through its coupling-dogs 47 with the dogs 48 of the worm 33, the latter is now drawn into rotation with the shaft 25 and drives in its turn the two worm-wheels 34 and 40. The former causes the shaft 32 to turn and this acts through the arms 15 on the rods 13 and 14 that provide for the dropping of the wheels 4 and bring them into the position 4a while the wheel 40, rigid with the shaft 41, acts through the connecting rod 17 on the rod 18 that causes the wheel 3 to drop and brings it into the position 3a.

Moreover, when the wheel 40 rotates, its dog 42 takes up the position 42a as it moves anti-clockwise, so that, at the end of its travel, it bears on the lever 38 and urges it into the position 38a, the end of this lever then moves into the position 43a while its projecting arm 39 assumes the position 39a in which it is withdrawn from the recess 20 between the flanges 30—31 of the sliding sleeve which is thus allowed to slide freely along the shaft 25 under the influence of arm 32 of spring lever 22. If at this point, the pilot pulls at the wire cable 7, arm 32 of spring lever 22 pushes on flange 30 of the sliding sleeve and moves the same from the right to the left, thus engaging its coupling dogs 29 with the coupling dogs 27 of worm 26, so that, if the pilot continues rotating the crank 8, it is the worm 26 that is driven, and thus the worm-wheel 36. As the wheel 36 is rigid with the shaft 35, it drives this shaft that acts through the arms 12 on the rods 11 that control the flaps 5 and brings them into the position 5a.

It should be clearly understood that the invention is not by any means confined to the example described and illustrated and that the control device can undergo numerous changes without unduly widening the scope of the invention. In particular, the definite shape and arrangement of the levers and wheels may be altered, the control may be either actuated by hand or by any other suitable means and so on.

What I claim is:

1. In an aircraft provided with a retractable landing gear and landing flaps, a single actuating mechanism for both said landing gear and flaps, comprising a driving shaft, a landing gear operating device, a landing flaps operating device, a control member having a first position for protraction of said landing gear and a second position for protraction of said landing flaps, locking means for locking said control member in its first position during the protraction movement of the landing gear, and means to release automatically said locking means when the landing gear is in its protracted position.

2. In an aircraft provided with a retractable landing gear and landing flaps, a single actuating mechanism for both said landing gear and flaps, comprising a casing, a driving shaft in said casing, a landing gear operating device constituted by a worm rotatably mounted on the shaft and in mesh with at least one worm wheel, a landing flaps operating device constituted by a worm rotatably mounted on the shaft and in mesh with a worm wheel, a control member between said devices movable parallel to and rotating with said shaft, means for coupling said control member with either of said devices, a locking member for locking said control member against engagement with said flaps operating device during the protraction movement of the landing gear, and means carried by said landing gear operating device to release automatically said locking member when the landing gear is in its protracted position.

3. In an aircraft provided with a retractable landing gear and landing flaps, a single actuating mechanism for both said landing gear and flaps, comprising a casing, a driving shaft in said casing, two worms rotatably mounted on the shaft, a slidable sleeve between said two worms rotating in unison with said shaft, means for shifting said sleeve parallel to said shaft for coupling the same with either of said worms, at least one worm wheel in mesh with one of the worms for operating the landing gear, a worm wheel in mesh with the other worm for operating the flaps, a latch normally locking the sleeve against engagement with the worm driving the flap operating worm wheel, and means carried by the landing gear operating worm wheel to release said latch when the position of the last-mentioned worm wheel corresponds to the protracted position of the landing gear.

RAYMOND SAULNIER.

REFERENCES CITED

The following references are of record in the file of this patent:

UNITED STATES PATENTS

| Number | Name | Date |
|---|---|---|
| 2,211,272 | Kennedy | Aug. 13, 1940 |
| 2,293,198 | Filmer | Aug. 18, 1942 |
| 2,331,108 | DeGanahl | Oct. 5, 1943 |
| 2,406,524 | Ashton et al. | Aug. 27, 1946 |
| 2,417,691 | Kelley et al. | Mar. 18, 1947 |
| 2,449,084 | Murray | Sept. 14, 1948 |

FOREIGN PATENTS

| Number | Country | Date |
|---|---|---|
| 18,439 | Great Britain | of 1911 |